No. 677,590. Patented July 2, 1901.
F. OLDFIELD.
ELLIPSOGRAPH.
(Application filed Apr. 29, 1901.)
(No Model.)
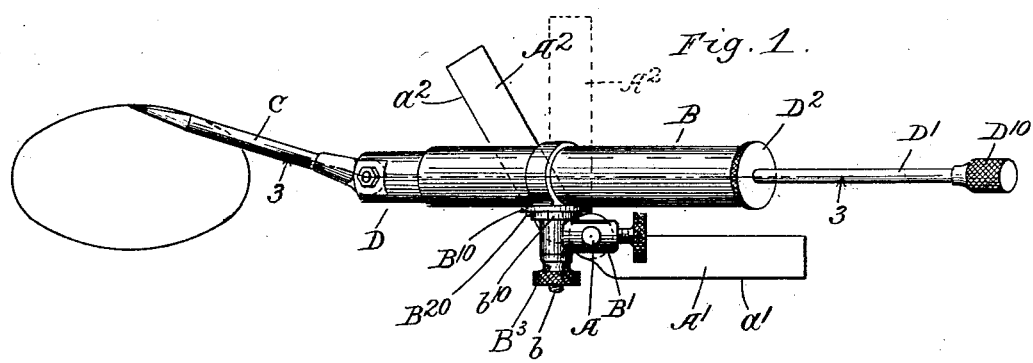
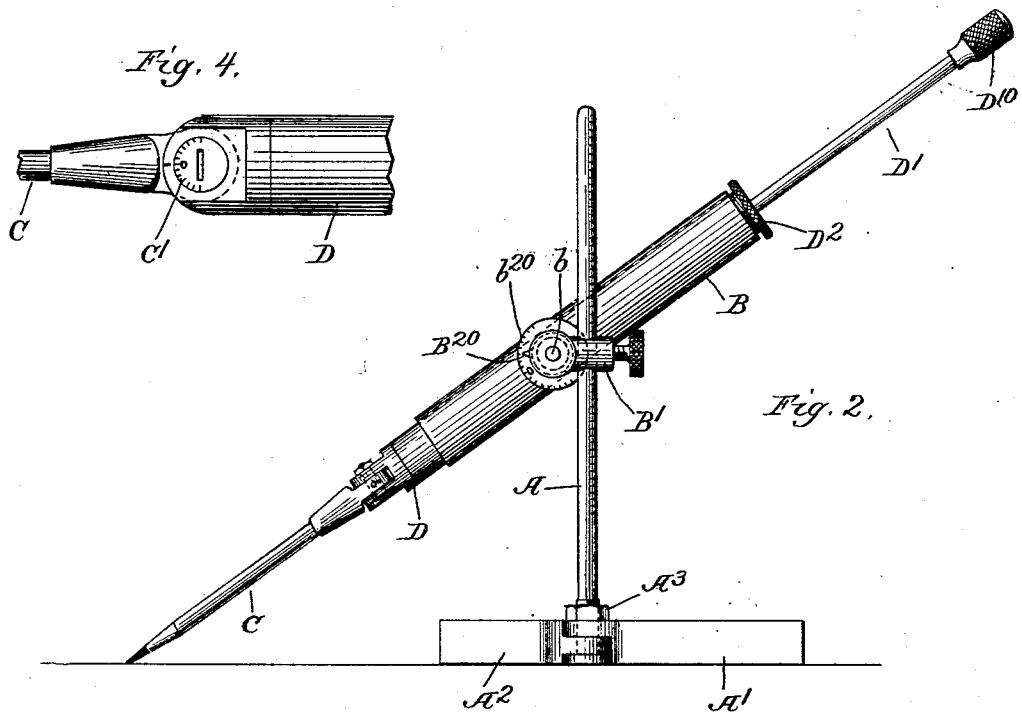
Witnesses.
Edward F. Wray.
Edgar L. Conant
Inventor.
Fred Oldfield
by Burton & Burton
his Atty's

UNITED STATES PATENT OFFICE.

FRED OLDFIELD, OF CHICAGO, ILLINOIS.

ELLIPSOGRAPH.

SPECIFICATION forming part of Letters Patent No. 677,590, dated July 2, 1901.

Application filed April 29, 1901. Serial No. 57,893. (No model.)

*To all whom it may concern:*

Be it known that I, FRED OLDFIELD, a citizen of the United States, residing at Chicago, in the county of Cook and State of Illinois, have invented certain new and useful Improvements in Ellipsographs, of which the following is a specification, reference being had to the accompanying drawings, forming a part thereof.

Figure 1 is a plan view of my ellipsograph. Fig. 2 is a side elevation of the same. Fig. 3 is an axial section at the line 3 3 on Fig. 1. Fig. 4 is a detail side elevation of the hinge-joint of the marker to its shaft.

A is a standard which preferably has a base consisting of two feet $A'$ $A^2$, hinged together about the axis of the standard and provided with a nut $A^3$ to secure them, with their respective straight edges $a'$ $a^2$, at any desired angle to each other.

B is a bearing for the marker-shaft. It is attached by a horizontal pivot at right angles to the shaft-axis to a clip $B'$, the latter being mounted on the standard and adapted to slide vertically thereon, and by this means said bearing is made adjustable vertically with respect to the standard and angularly in a vertical plane—that is to say, about the pivot $b$ of the bearing—to the clip. Preferably the standard A is graduated, as shown, so that any adjustment once used may be reproduced at will. The pivot $b$ of the bearing to the clip is a threaded stem projecting laterally from the bearing at the center of a circular-faced boss $B^{10}$, said stem taking through the center of a similar circular-faced boss $b^{10}$ on the clip, said two circular-faced bosses constituting broad flat shoulders which are clamped together by means of the nut $B^3$ on the pivot-stem $b$, and in order to indicate the angular adjustment of the bearing one of these shoulders is graduated, as seen at $b^{20}$, and the other has a reading-point at $B^{20}$, which stands at zero of said graduated scale when the axis of the bearing is horizontal, so that the reading upon the graduated scale denotes the angle of deflection of the axis of the bearing from horizontal position. This bearing is preferably a long sleeve, as illustrated, and the shaft D of the marker telescopes in such sleeve, being also rotatable in it. Preferably the shaft at the upper part is reduced to a mere rod or stem $D'$, which emerges from a centrally-apertured cap $D^2$ at the upper end of the sleeve-bearing B. This insures to the shaft accuracy of alinement if protruded to the utmost extent which the length of the sleeve-bearing permits. The upper end of the reduced end $D'$ of the shaft, which protrudes beyond the cap of the bearing, is provided with a knob $D^{10}$, by means of which the shaft can be rotated readily by the operator, while at the same time it may be telescoped or moved longitudinally in the sleeve-bearing, as necessary in tracing the desired elliptical outline on the plane on which the standard rests.

The marker C is hinged to the lower end of the shaft D and provided with means for securing it at any angular adjustment with respect to the shaft—that is, with its marking-point distant as much as may be desired from the axis of the shaft, such distance being the shorter radius of the ellipse, which may be delineated by rotating the shaft in the bearing and at the same time moving it longitudinally therein as required to keep the marking-point on the paper. The form of the hinge-joint of the marker to the shaft is such as to adapt it to be clamped tight, as is desirable, and at the same time to permit the entire joint to telescope up within the sleeve-bearing to any extent which is consistent with the divergence with the marker, and it may have a graduated scale, as seen at $C'$, Fig. 4.

The purpose of the adjustable feet $A'$ of the base having their respective straight edges is to adapt the instrument to be used in drawing a series of ellipses or elliptical arcs—such as will be necessary, for example, in a perspective or oblique view of the outlines of a turned column—or of a series of wheels or rings on a shaft. For this purpose one of the straight edges should be in a plane at right angles to the vertical plane in which the angular adjustment of the marker-shaft is made, the latter plane corresponding to the longer axis of the ellipse produced, and in using the device for that purpose such straight edge would be moved against the straight edge of a ruler placed upon the paper in the direction of the shorter axes of the several elliptical arcs to be drawn. The other straight edge is useful in drawing a series of ellipses or elliptical arcs—such as would be required, for instance, to represent in oblique or perspective view corresponding elements of a series of similar parallel-turned columns—such edge being then adjusted at an angle to the first edge corresponding to the angle of the perspective view.

I claim—

1. An ellipsograph, comprising a standard, a bearing adjustable vertically on the standard and angularly in a vertical plane, and means for securing it with respect to both such adjustments; a shaft sliding and rotating in such bearing, and a marker carried by the shaft and adjustable toward and from the axis of the latter.

2. An ellipsograph, comprising a graduated standard, a bearing adjustable vertically on the standard and angularly in a vertical plane, and means for securing it with respect to both such adjustments; a shaft sliding and rotating in such bearing, and a marker carried by the shaft and adjustable toward and from the axis of the latter.

3. An ellipsograph, comprising a standard, a bearing adjustable vertically on the standard and angularly in a vertical plane; means for securing it with respect to both such adjustments; a shaft sliding and rotating in such bearing; a marker carried by the shaft and adjustable toward and from the axis of the latter; and a graduated arc about the center of the angular adjustment of the bearing in the vertical plane, and means for reading on said arc such angular adjustment.

4. An ellipsograph, comprising a graduated standard, a bearing adjustable vertically on the standard and angularly in a vertical plane, means for securing it in respect to both such adjustments and for indicating the angular adjustment; a shaft sliding and rotating in such bearing, and a marker carried by the shaft and adjustable toward and from the axis of the latter.

5. An ellipsograph, comprising a standard, a bearing adjustable about the standard and vertically thereon, and also angularly in a vertical plane, and means for securing it with respect to each of such adjustments; a shaft sliding and rotating in such bearing, and a marker carried by the shaft and adjustable toward and from the axis thereof; the standard having a base provided with a horizontal straight edge at one side, and means for indicating the adjustment of the bearing about the standard angularly with respect to said straight edge.

6. An ellipsograph, comprising a standard, a bearing adjustable about the standard and vertically thereon, and also angularly in a vertical plane, and means for securing it with respect to each of such adjustments; a shaft sliding and rotating in such bearing, and a marker carried by the shaft and adjustable toward and from the axis thereof; the standard having a base provided with a horizontal straight edge at one side.

7. An ellipsograph, comprising a standard having a base provided with a straight edge; a bearing adjustable vertically on the standard and also angularly in a vertical plane, adapted to be fixed with respect to the vertical plane of said straight edge; a shaft sliding and rotating in such bearing; and a marker carried by the shaft, adjustable toward and from the axis thereof.

8. An ellipsograph, comprising a standard having a base composed of two parts pivoted together and each having a straight edge and adapted to be adjusted about their pivot to vary the angle of such straight edges to each other; a bearing adjustable vertically on the standard and angularly in a vertical plane, and means for securing it with respect to both such adjustments; a shaft sliding and rotating in such bearing, and a marker carried by the shaft and adjustable toward and from the axis of the latter.

9. An ellipsograph, comprising a standard having a base consisting of two parts pivoted together, each having a straight edge and adapted to be adjusted and secured together about their pivot to vary and fix the angle between their straight edges, and means for indicating such angle; a bearing adjustable vertically on the standard and angularly in a vertical plane, and means for securing it with respect to both such adjustments; a shaft sliding and rotating in such bearing, and a marker carried by the shaft and adjustable toward and from the axis of the latter.

10. An ellipsograph, comprising a standard, a sleeve-bearing adjustable vertically thereon and angularly in a vertical plane; means for securing it in respect to each of such adjustments; a shaft telescoping and rotating in said sleeve-bearing; a marker hinged to the lower end of the shaft, and means for securing it in adjustment as to its divergence from the shaft-axis; the other end of the shaft protruding from the sleeve and provided with a suitable knob or handle for rotating and sliding the shaft in the sleeve.

In testimony whereof I have hereunto set my hand at Chicago, Illinois, in the presence of two witnesses, this 20th day of April, A. D. 1901.

FRED OLDFIELD.

In presence of—
CHAS. S. BURTON,
EDGAR L. CONANT.